United States Patent Office 3,103,451
Patented Sept. 10, 1963

3,103,451
NON-CONGEALING CEREAL STARCH PASTES
John W. McDonald, Edward H. Grosse, and Oliver R. Etheridge, Decatur, Ill., assignors to A. E. Staley Manufacturing Company, Decatur, Ill., a corporation of Delaware
No Drawing. Filed Jan. 25, 1960, Ser. No. 4,215
7 Claims. (Cl. 127—32)

This invention relates to non-congealing cereal starch pastes, and to their use in textile sizing and paper coating. More particularly it relates to novel non-congealing cereal starch pastes which are much less viscous in the temperature range of 200°–210° F. than equal concentration pastes made by conventional pasting of the same starch with water at 200°–210° F.

The congealing or gelling property of the conventional hot water pastes of cereal starches in general, and of corn starch in particular, is well known. By contrast, the conventional hot water pastes of the tuber starches, such as tapioca and potato, and of the waxy starches, such as waxy corn and waxy sorghum, are comparatively non-congealing. For example, a paste of unmodified corn starch containing 10% by weight of starch dry substance and made by conventional heating of the starch with water at 200°–210° F. sets to a rigid opaque gel when cooled to 75° F. and aged 48 hours at that temperature. Furthermore, the gel thus obtained does not reconstitute or return to its earlier hot fluid (though viscous) condition when reheated to 200°–210° F. The heated product may soften some, depending upon the time and temperature of aging, but it remains a firm gel.

On the other hand, equal concentration pastes of the tuber and waxy starches, made by conventional heating of the starch with water at 200°–210° F., behave quite differently when cooled and aged. They become more viscous, and may appear to form gels at the higher concentrations, but they differ distinctly as a group from the corresponding cereal starch pastes by returning substantially to the original hot fluid condition when reheated to 200°–210° F. Partly on this account, and partly because their moderately concentrated pastes (i.e., 10–15% by weight of starch) are less viscous and less gel-like than corresponding cereal starch pastes after cooling and aging, they are referred to as non-congealing.

The congealing property and relatively high hot paste viscosity of conventional unmodified cereal starch pastes are exploited in some commercial applications of starch pastes. Chief among these are the manufacture of corrugated paperboard and charcoal briquettes. In many other commercial uses of starch pastes, however, notably in textile sizing and paper coating, the two properties are objectionable. Generally speaking, the utility of cereal starch pastes in these two manufacturing processes is greatly increased by modifying the starch or its paste so as to decrease the hot paste viscosity and the congealing property. Reduction in hot paste viscosity is necessary, otherwise the pastes of required fairly high starch solid contents are to viscous to perform their intended function and to be handled satisfactorily by the standard factory equipment. Elimination or substantial reduction of congealing property is desirable, otherwise the paste may cause trouble during shut-down by congealing in unheated pipelines and storage tanks. Also, small pieces of congealed paste, formed on the equipment wherever sufficient cooling and aging of the hot paste occur, may become dislodged from time to time, enter the stream of hot paste and impair the loom efficiency of a textile weaving operation or the quality of a coated paper.

A widely used commercial method of modifying cereal starches to reduce their hot paste viscosity and congealing property is to expose them in water slurry to a soluble hypochlorite below the starch pasting temperature. The modified starch is then recovered by filtration, washing, and drying. The paste property modifications thus obtained depend mainly upon the weight ratio of hypochlorite to starch, and the temperature and pH of the treatment.

The hypochlorite modification or oxidation of cereal starches has the disadvantage of solubilizing a minor proportion of the starch granule, thus reducing the yield of modified starch and producing a soluble by-product mixture of inorganic salt and degraded starch whose disposal frequently adds to the cost of the process.

We have discovered that the congealing of conventional hot water pastes of the cereal starches can be prevented or greatly reduced by pasting the starch at higher temperatures, i.e., substantially above the conventional temperature range of 200°–210° F., and then cooling the hot paste below the conventional pasting temperature range according to a novel schedule of time and temperature. Furthermore, the pastes, which thicken appreciably, but do not congeal, during the cooling and aging part of our process, thin out when reheated to commercial application temperatures of about 200° F. They return to about the same viscosity they had when first cooled to those temperatures from the elevated pasting temperature of our process. In this respect they resemble the waxy and tuber starch pastes.

Cereal starch pastes made according to our invention possess several advantages over the hypochlorite oxidized cereal starch pastes. They cost less per unit weight of starch dry substance because there is no expense for oxidizing agent and there is no loss of starch dry substance. Another advantage is the absence of soluble by-products whose disposal is usually an added expense.

An important object of our invention is to provide novel non-congealing water pastes of the cereal starches which are much less viscous at 200°–210° F. than an equal concentration paste of the same starch prepared by conventional cooking of the starch with water at 200°–210° F. Another object is to provide a novel method of preparing the non-congealing cereal starch pastes. Another object is to increase the loom efficiency in the weaving of cotton goods by sizing the warp with the novel pastes of our invention. Another object is to improve the quality of coated paper by use of our non-congealing pastes in the paper coating slip. Still another object is to provide novel non-congealing cereal starch pastes whose paste properties resemble those of hypochlorite oxidized cereal starches and whose production cost is less than that of the oxidized starch pastes. Additional objects will become apparent from the following description of the invention.

The novel starch pastes of our invention are obtained by the following sequence of steps: (1) prepare a fluid solution or paste by heating a mixture consisting essentially of starch and water above about 250° F., but not so high as to degrade the starch substantially; (2) cool the hot solution or paste below about 210° F.; and (3) maintain the cooled fluid solution above about 120° F. for at least 8 hours.

In this application the word "starch" is used in a generic sense. As illustrated hereafter, any variety of cereal starch or mixture of cereal starches may be used, including corn, rice, wheat, and sorghum, although there may be some variation in the operation of the process with some of these starch varieties. We include starch that has been pregelatinized in the usual way and that has been roll- or spray-dried, i.e., the starch often referred to as cold-water-swelling or cold-water-soluble. In this process, we can paste starch in the usual way by heating under the boiling point of the starch slurry and then carry the paste, without cooling, through the process. Slightly modified or slightly dextrinized starch, or starch that has been reacted to form a derivative with a minor amount of substitution whether before or after gelatinization, may be substituted for native cereal starch, so long as these are substantially equivalent to the native starch in pasting properties. However, such starch products are more expensive and provide no offsetting advantage over the native or unmodified granular starches.

It is convenient, and preferred, to start our process with a water slurry of ungelatinized starch granules and carry out the necessary heating and cooling without interruption. The viscosity of the starch-water mixture, which is low and relatively constant below the starch gelatinization temperature (150°–160° F.), increases rapidly with temperature above that value, peaks at a temperature between the gelatinization temperature and the selected operating temperature above about 250° F., and then rapidly declines to the final low value in the first step of our process. The starch paste or solution thus obtained is almost as mobile as the original water slurry of ungelatinized starch granules. It is clear and apparently homogeneous.

The viscosity of the starch solution obtained at the end of the first step, as measured after quick cooling of the solution to about 205° F., varies with the operating temperature of that step and its duration. The viscosity drifts downward as the time and operating temperature are increased, either singly or together. The downward drift is moderate within the operating temperature range of 250°–350° F. and up to 30 minutes duration of the operating temperature. Above an operating temperature of 350° F. and beyond 30 minutes duration, particularly at the higher temperatures, the downward drift of viscosity is accelerated, and the final compositions of our process, i.e., the cooled and aged starch solutions obtained from step (3), begin to lose their non-congealing property and exhibit an increasing ability to form gels. These changes are attributed to thermal degradation or depolymerization of the starch.

We have observed changes in the appearance of starch pastes during step (3) of our process which we associate with the non-congealing character of the final pastes. In this step the pastes, originally clear at the end of step (1) and through step (2), lose their clarity and become increasingly cloudy, but they do not congeal and assume the whitish or porcelain-like appearance of control conventional pastes. The cloudiness is due to the separation of a solid micro-crystalline material from the originally clear and homogeneous starch solution of paste. Normally, this material remains uniformly suspended in the liquid phase, particularly if the original starch concentration is at least about 10% by weight, or if the paste is mildly agitated, as, for example, by being pumped through pipes.

When the non-congealing cereal starch paste is prepared in accordance with this invention, its viscosity behavior is stabilized and it does not congeal even when ultimately cooled to room temperature. The viscosity characteristics are stabilized to such an extent that the fluid paste may be repeatedly heated and cooled, below its atmospheric boiling point, its viscosity being always essentially the same at any particular temperature, and no starch gel is formed even though this might be expected of the type starch employed. If, on the other hand, the hot fluid solution is not held above about 120° F. for the necessary period, the solution, in common with the usual starch pastes of the particular variety of starch, suffers "set-back" on cooling, i.e., forms a gel. The congealing is evidenced initially by increases in the viscosity measurement; with the passage of time, the apparent viscosity increases and the solution becomes more and more cloudy. The material takes on a lumpy consistency, then becomes salve-like and ultimately may become rigid. This process is not reversible, i.e., the gel cannot be rendered fluid by reheating below about 250° F.

Gel formation, or set-back, is not simply an increase in viscosity; a gel of this type is different in kind from the most viscous liquids. A starch gel has many properties that are comparable to those of a solid. It is often rigid and may have a definite shape. Its rigidity or "gel strength" is measured by a determination of the force necessary to rupture the gel under certain conditions, a measurement that is said to involve the elastic limit. This peculiar characteristic of starch solutions or starch pastes has been attributed to the formation of an interlaced network of randomly oriented linear molecules. The formation of such a gel takes place progressively over a period of time so that on cooling rapidly only a fraction of a solution or paste may have congealed. Then the remainder congeals over a period of time until the entire mass is rigid. During the congealing, the process referred to as retrogradation takes place and small particles form that are usually submicroscopic and at most are of the order of five microns. These particles do not grow in the gel structure nor can they be easily separated from the gel structure in which they are embedded.

To return to the process steps, when the process is begun with a dry starch in the granular ungelatinized form, the starch is first mixed with water by any suitable means to suspend it. This may be simply a tank with an agitator to assure that the starch is thoroughly suspended and is uniformly dispersed when used. The mixture of starch and water is then heated above about 250° F.

The starch suspension is desirably brought to temperature rapidly and we prefer to use the type of apparatus disclosed in application Serial No. 790,487, filed February 13, 1959, for O. R. Etheridge. In this apparatus, steam at superatmospheric pressure is continuously mixed with the starch suspension in the throat of a steam jet. In this way, the suspension is brought to the desired temperature virtually instantaneously and the starch is cooked to a fluid solution within a few seconds. In the apparatus of the patent application referred to, the steam-heated suspension flows downward into and through a detention zone where the hot suspension is maintained at an elevated temperature for a period of time that is selectable. This apparatus is so arranged and constructed that there is substantially no mixing in the detention zone in order that the starch solution withdrawn from the bottom of the detention zone be maintained at a uniform temperature for a uniform length of time. Other forms of this type of apparatus may also be used for heating, for example, of the types disclosed in U.S. Patent Numbers 2,871,146; 2,582,198; and 2,805,966 (Etheridge).

Other methods may be used in heating the starch-and-water mixture. As described below, we have heated a starch-water mixture in an autoclave and have pumped such a mixture through a heat exchanger which comprised a coil of tubing in a constant-temperature environment, and similar results are obtained by heating in this manner.

It is desirable to agitate the starch suspension when bringing it up to temperature in order to assure uniform heating and rapid heat transfer. This is readily accomplished in the steam-jet type of apparatus already described.

The final temperature above 250° F. to which the solution is heated and the time at temperature both have an influence on the results obtained. Within limits, relatively high temperatures and long times appear to have an advantageous effect on the hot viscosity and viscosity stability of the solution after cooling. Nevertheless, the higher the temperature or the longer the time at temperature, the greater is the tendency for the starch to become degraded, i.e., to be of lower molecular weight. At the minimum, the starch solution must be kept above 250° F. until all the starch is acted upon uniformly. Then as the temperature is increased or the time above 250° F. is increased, the other should be decreased. As a compromise between desirable and undesirable effects, temperatures in the range of 250° F. to 350° F. can be used when the suspension is heated to temperature in less than five minutes and held at temperature for up to about 30 minutes additional. Excellent results have been obtained by heating the starch and water to a temperature of 280 to 320 substantially instantaneously in a continuous manner and holding at temperature for 0.5 to 15 minutes. Temperatures in excess of about 350° F. should be avoided because at this point degradation is too rapid, but this temperature limit will vary 10 or 20° F. depending on the variety of cereal starch.

In the first stage of cooling from above about 250° F., the starch solution may be cooled at any suitable rate to a temperature of about 210° F. It is preferably cooled rapidly to this temperature as by flashing the solution to atmospheric pressure when the Etheridge apparatus is used, or by quenching. While slow cooling to the atmospheric boiling point is possible, as by permitting the temperature of the solution and the apparatus containing it to decrease without forced cooling, this is preferably avoided to avoid degrading or hydrolyzing the starch.

The second part of the cooling cycle is critical. In order to obtain the desired non-congealing property, we have discovered that the solution must be kept for a period between about 120° F. and about 210° F. Preferably it is cooled slowly between those temperatures.

We have found that the hot fluid starch solution may be rapidly cooled from about 210° F. to any particular temperature at or above about 120° F. and held there for the time necessary to provide the desired non-congealing property. However, the rate at which this occurs at constant hold temperature is much slower than it is when the solution is cooled gradually through the temperature range of 210° F. to about 120° F. We have observed that the rate of appearance of the aforementioned solid microcrystalline material in the cooled paste is greater during the variable temperature cooling than it is during the constant temperature cooling, even at the lowest value of about 120° F., and we assume that the more rapid appearance of this microcrystalline material is responsible for the more rapid attainment of the stabilized viscosity.

There is considerable variation with holding temperature in the time necessary to provide the desired viscosity stability when the hot fluid starch solution is cooled rapidly to a particular temperature in the range of about 210° F. to about 120° F. and held constant. The time is less when the temperature is higher, and at 120° F. the time required may exceed 48 hours for corn starch. Accordingly, we prefer to cool the solution gradually through the temperature range, taking at least 8 hours. After the solution has been cooled to about 120° F., and attained its non-congealing character, it may be cooled further, rapidly or slowly, without losing that character.

The following examples of our invention are illustrative only and are not intended to limit the invention. Commercial grades of starch are used in all the examples.

EXAMPLE 1

A suspension of granular native corn starch in water having a density of 5.6° Bé. and a pH of 6.5 was converted to a fluid solution by heating in an apparatus of the type described in the Etheridge application referred to before. The sample was retained in the hold tank for 6 minutes. The steam pressure in the jet mixer was 77 pounds per square inch gage (p.s.i.g.) and the starch suspension was introduced to the jet mixer at about 95 pounds p.s.i.g. In the hold tank the steam pressure was maintained at 56 pounds p.s.i.g. while the actual measured temperature in the tank was 297° F.

The starch solution, when first removed from the hold tank, had the appearance of a clear solution. When discharged to atmospheric pressure, the temperature of the solution dropped to below the boiling point of water (in the neighborhood of 208° F.). The viscosity was measured on a Brookfield viscometer and, at 208° F., the value was 102 centipoises while a second sample run at 206° F. had a viscosity of 105 centipoises. The pH of the paste was 6.7, and its solids content was 9.5% by weight.

A quantity of the solution was divided into three portions for cooling at different rates. The rates are indicated in Table 1. To obtain the different cooling rates the portions were permitted to cool in three containers, each insulated differently from the others. The containers were, respectively, a stainless-steel beaker without insulation, a household picnic jug insulated with a fibrous form of insulation, and a Dewar flask. It will be noted that the temperature of portion 1 (stainless-steel beaker) dropped to 120° F. in a little over 4 hours. The temperatures of portion 2 (picnic jug) and portion 3 (Dewar flask) dropped to 120° F. in about 11 and 32 hours respectively. Portion 1 set to a firm gel, while the other two portions remained fluid. Furthermore, portions 2 and 3 remained fluid and non-congealing when quickly cooled to 70° F. and allowed to age at that temperature for 48 hours.

*Table 1*

|  | Portion 1, hrs. | Portion 2, hrs. | Portion 3, hrs. |
| --- | --- | --- | --- |
| 200° F | 0 | 0 | 0 |
| 175° F | 0.5 | 2 | 4 |
| 158° F | 1.7 | 3.4 | 10 |
| 140° F | 2.3 | 6.1 | 18 |
| 120° F | 4.0 | 11.2 | 32 |
| 70° F | 5 | 12 | 33 |

EXAMPLE 2

The procedure of Example 1 was repeated except that the solution was maintained at 299° F. for 12 minutes in the hold tank. Again, a sample of the starch solution cooled in a stainless steel beaker according to portion 1, Table 1 set to rigid gel, and portions cooled according to portions 2 and 3, Table 1, remained fluid and were non-congealing. The viscosity of the hot fluid starch solution was 90 centipoises at 206° F., its pH was 6.7 and its starch content was 9.5% by weight.

EXAMPLE 3

The procedure of Example 1 was repeated with a holding time of 9 minutes. The hot fluid starch solution had a Brookfield viscosity of 88 centipoises at 206° F., its pH was 7, and its starch content was 9% by weight. When a sample of the solution was cooled in a picnic jug according to the schedule of portion 2, Table 1, it was fluid and remained non-congealing on further aging at 70°–80° F.

EXAMPLE 4

The procedure of Example 3 was repeated in all essential details except that the native corn starch was replaced with native wheat starch. The Brookfield viscosity of the hot fluid starch solution at 206° F. was 119 centipoises. Its pH was about 7 and its starch content was about 9% by weight. A sample of the solution or paste cooled in a picnic jug according to the schedule of portion 2, Table 1, was fluid and remained non-congealing on further aging at 70°–80° F.

EXAMPLE 5

The procedure of Example 3 was repeated in all essential details except that the native corn starch was replaced with native rice starch. The Brookfield viscosity of the hot fluid starch solution at 206° F. was 103 centipoises. Its pH was 6.5 and its starch content was about 9% by weight. A sample of the solution cooled in a picnic jug according to the schedule of portion 2, Table 1, was fluid and remained non-congealing on further aging at 70°–80° F.

While all of the foregoing examples are based on steam jet heating of the starch solution, the heating step may be performed otherwise. The following examples illustrate the results obtained when the heating step is carried out differently.

EXAMPLE 6

A slurry of granular native corn starch and water at room temperature, containing about 9.5% starch solids by weight, was pumped at a constant rate through a coil of tubing immersed in an oil bath maintained at about 300° F. The detention time of the starch-water mixture in the heating bath was about 2 minutes. The hot fluid starch solution thus formed was discharged at atmospheric pressure and immediately dropped in temperature to about 210° F. A quantity was caught in a container and held under conditions that provided a cooling rate slightly slower than the schedule of portion 2, Table 1. The paste thus cooled was fluid and remained non-congealing on further aging at 70°–80° F.

EXAMPLE 7

This example illustrates the use of an autoclave in the method of this invention. Two hundred grams of corn starch was suspended in two liters of water. The mixture was heated for 45 minutes with stirring using a steam bath and an immersion heater. The temperature was about 205° F., although there was some surface boiling on the immersion heater.

About 1.5 liters of the clear starch paste that was formed was poured into an autoclave and the autoclave was sealed and heated electrically. After about half an hour the temperature had risen to about 306° F.; the autoclave was then permitted to cool. After about another 65 minutes, when the temperature had fallen to about 210° F., the autoclave was opened. A sample of the starch solution was transferred to a loosely stoppered Dewar flask to cool according to the schedule of portion 3, Table 1. The final paste was fluid and remained non-congealing on continued aging at 70°–80° F.

When a 9% native corn starch paste (i.e. 9% by weight of starch) is made by conventional cooking of the starch and water at 200–210° F. and held at that temperature for one hour, its Brookfield viscosity at 206° F. ranges from 900 to 1000 centipoises, approximately ten fold that of the corresponding pastes of our invention at the same temperature. And when the conventional 9% corn starch pastes are cooled to room temperature (i.e., 75° F.), either slowly according to the method of our invention, or more rapidly, they gradually set to rigid opaque gels which do not liquify or return to their original fluid condition when reheated to about 210° F. The gel strength of the gel thus obtained, as measured by the method described at pages 200–207, volume 32 (1955), Cereal Chemistry, ranges from 800 to 900 gram centimeters. On the same basis, the gel strength of the corresponding non-congealing corn starch paste obtained by our invention is substantially nil.

Our explanation for the striking effects of the high temperature cooking and controlled cooling of the cereal starch pastes is as follows. The high temperature cooking dissociates the two fractions or molecular species in starch, i.e., the amylose or straight chain fraction and the amylopectin or branched chain fraction. Being thus dissociated from the major fraction, amylopectin, the amylose is free to crystallize when the hot paste or solution is cooled. The amylose crystallizes rather slowly because of its high molecular weight and because it is dissolved in a solution of a still higher molecular weight polymer, the amylopectin. If the hot paste or solution is cooled too rapidly, i.e., if the amylose crystallization lags too far behind, the degree of amylose supersaturation, or some other solution parameter, exceeds a critical value and the phenomenon of congealing sets in. We do not attempt to explain the detailed mechanism of starch paste congealing, but we do relate it to the weight concentration of amylose in solution at a given temperature.

It is our observation that a cereal starch paste prepared by cooking above about 250° F. will congeal if it contains in solution from 1.0 to 1.5% by weight of amylose and it is held for an appreciable length of time below about 120° F.

The amylose present in the cereal starch pastes of our invention as a microcrystalline material can be isolated by centrifuging the paste for 30 minutes in a high speed centrifuge, collecting the solid phase, mixing it with several volumes of cold water, and recentrifuging. The amylose content of the recovered solid material, on a "pure" amylose basis, is determined by measuring its blue value and its moisture content, as described below, and then correcting the moisture-free content of the material by the ratio of its blue value to the standard blue value of the "pure" amylose of the particular starch species.

The blue value of a starchy material is measured as follows: An accurately weighed sample of about 0.1 gram is placed in a 100 ml. volumetric flask. The sample is mixed with 1 milliliter of ethanol, 10 milliliters of water and 2 milliliters of 10% sodium hydroxide. The sample is then heated until clear, cooled, and additional water added to make the 100-milliliter volume. Five milliliters of this solution is transferred to a 500-milliliter flask to which 100 milliliters of water is added followed by three drops of 6 N hydrochloric acid. These are mixed by shaking, and then five milliliters of iodine solution (0.2% iodine and 2% potassium iodide) is added and the whole made to the 500-milliliter volume. The optical density of this solution at 680 m$\mu$ is read by means of a Beckman spectrophotometer using a 2-centimeter cell against a blank made in the same way without carbohydrate. The blue value is then the measured optical density multiplied by 0.2 and divided by the dry substance weight of the sample. As an alternative to the ethanol-sodium hydroxide mixture, the sample may be dissolved in 5 milliliters of 1 N sodium hydroxide without heating.

The blue value permits one to distinguish between amylose and amylopectin because the former, as a class, has a high blue value and the latter, as a class, has a low blue value. The reported blue values of amylose carefully separated from commercial corn starch cluster at about 1.1, and for purposes of this application, the standard blue value of corn amylose is 1.1.

The dry substance content of the starchy material, or amylose, is determined by drying a small accurately weighed sample to constant weight in an oven at 230° F.

The approximate concentration of amylose remaining dissolved in cereal starch pastes prepared in accordance with our invention can be calculated, knowing the dry substance weight and amylose content of the initial starch, and the dry weight of amylose which has separated from solution as a microcrystalline material.

The following experimental results led us to the foregoing generalization about congealing of cereal starch pastes cooked above about 250° F.

Hot fluid corn starch paste at 9.5% starch solids, 6.7 pH, and about 208° F. is prepared according to Example 1. Aliquots (1000 ml.) are cooled by appropriate means according to the schedule in Table 2. A measured portion of each aliquot is then immediately centrifuged to recover the crystallized amylose as described above. The weight and blue value of the recovered amylose are also determined. From these data the weight concentration of dissolved amylose remaining in the liquid portion of the paste are calculated and recorded in Table 2.

Another portion of each aliquot is cooled to room temperature (75° F.) immediately after the cooling schedule is completed. It is allowed to stand 48 hours at room temperature and then examined for gelation. Results of this examination are also recorded in Table 2.

Table 2

| Cooling temp. range (° F.) | Cooling time (hours) | Dissolved amylose concn. (weight percent) | Paste property after cooling to 75° F. and aging |
| --- | --- | --- | --- |
| 208–120 | 24 | 0.2 | Fluid. |
| 208–120 | 12 | 0.4 | Fluid. |
| 208–120 | 8 | 0.9 | Fluid. |
| 208–120 | 6 | 1.1 | Gel. |
| 208–120 | 4 | 1.2 | Gel. |
| 208–120 | 2 | 1.3 | Gel. |
| 155–155 | 18 | 0.9 | Fluid. |
| 155–155 | 4 | 1.2 | Gel. |
| 140–140 | 36 | 0.7 | Fluid. |
| 140–140 | 12 | 1.5 | Gel. |
| 125–125 | 24 | 1.2 | Gel. |
| 125–125 | 48 | 1.1 | Gel. |

In view of the results listed in Table 2, our previous generalization about congealing can be stated in different words as follows: Cereal starch pastes prepared by cooking above about 250° F. and containing less than about 1% dissolved amylose will not congeal when cooled to 75° F. and aged.

The utility of our non-congealing cereal starch pastes is not impaired by the presence of the micro-crystalline amylose. The size of the crystal units seldom exceeds that of the parent starch granules. Furthermore, they are highly hydrated, apparently containing not over 25% solids, and thus have a density only slightly greater than that of the surrounding amylopectin solution. Although some of the larger particles of amylose will slowly settle out of quiescent pastes by gravity on long standing, such settling is not a problem in pastes of commercially useful concentration.

Non-congealing cereal starch pastes or widely varying starch concentration can be prepared according to our invention. Much more concentrated aqueous slurries of ungelatinized starch than those used in the foregoing examples can be heated and then cooled according to our invention to yield the non-congealing products. Less concentrated slurries can also be used, but the benefits of our process and the advantages of its pastes over conventional pastes decline with declining starch concentration, starting at about 4% starch by weight. Of course, useful non-congealing pastes can be made by diluting those prepared according to our invention, and with proper equipment, the pastes can be evaporated at temperatures below 210° F. to yield more concentrated non-congealing pastes.

Non-congealing corn starch pastes made according to our invention demonstrated unexpected advantages over conventional homogenized corn starch paste at the same starch concentration in the sizing of cotton warp used in the weaving of poplin-type cotton fabric. A conventional cornstarch size for cotton warp was prepared by cooking 300 pounds of commercial corn starch slightly acid modified with 13.5 pounds of beef tallow and enough water in an open kettle at about 210° F. for about one hour until a smooth clear paste was obtained. This was then passed through a conventional homogenizer at 2400 pounds per square inch pressure. The homogenized size, containing about 12% starch by weight was applied to a carded cotton yarn at the rate of one part starch to 7.5 parts warp by weight. A comparable paste was made from commercial unmodified corn starch according to our invention as follows. A slurry of 300 pounds of the starch in 201 gallons of water was cooked through the apparatus used in Example 1. Detention or cooking time was 5.25 minutes, cooking temperature was 290° F., and the discharged paste (at about 208° F.) contained 12% starch. It was blended with 13.5 pounds of melted beef tallow and applied to the same kind of cotton yarn at the same rate in the same kind of equipment as before. The following advantages were noted for the size based on the corn starch made according to our invention: (1) less hard size on the yarn, (2) fewer ends out of lease, (3) smoother sized yarn, (4) less shedding of fiber and starch, and (5) longer blanket life.

The two test warps were then compared in the weaving of poplin-type cotton fabric. Results of the loom stop study made during the weaving test are collected in Table 3.

Table 3

| | Homogenizer size | Non-congealing size |
| --- | --- | --- |
| Warp stops per net loom hour | 0.559 | 0.492 |
| Filling stops per net loom hour | 0.333 | 0.292 |
| Misc. stops per net loom hour | 0.121 | 0.062 |
| Total stops per net loom hour | 1.013 | 0.845 |

We claim:
1. The method of preparing non-congealing cereal starch pastes which comprises heating a mixture consisting essentially of cereal starch and water at temperature between about 250° F. and 350° F., whereby a fluid solution of cereal starch and water is obtained, cooling said solution to temperature from about 120° F. to about 210° F., and maintaining said solution within the temperature range of from about 120° F. to about 210° F. for at least 8 hours.

2. The method according to claim 1 wherein the cereal starch is corn starch.

3. The method according to claim 1 wherein the cereal starch is wheat starch.

4. The method according to claim 1 wherein the cereal starch is sorghum starch.

5. The method according to claim 1 wherein the cereal starch is rice starch.

6. A non-congealing cereal starch paste consisting essentially of a suspension of micro-crystalline highly hydrated cereal starch amylose in an aqueous medium, said aqueous medium consisting essentially of a water solution of cereal starch amylopectin and cereal starch amylose, the concentration of dissolved amylose in said aqueous medium not exceeding about one percent by weight, and the weight ratio of total amylose to amylopectin in the paste being substantially the same as it is in the parent cereal starch, said cereal starch paste being derived by the process which comprises heating a mixture consisting essentially of cereal starch and water at temperature between about 250° F. and 350° F., whereby a fluid solution of cereal starch and water is obtained, cooling said solution to temperature from about 120° F. to about 210° F., and maintaining said solution within the temperature range of from about 120° F. to about 210° F. for at least 8 hours.

7. The method of sizing cotton warp yarn which comprises the step of drawing said yarn through a size bath containing a non-congealing cereal starch paste prepared by heating a mixture consisting essentially of cereal starch and water at temperature between about 250° F. and about 350° F., whereby a fluid solution of cereal starch and water is obtained, cooling said solution to temperature from about 120° F. to about 210° F., maintaining said solution within the temperature range of from about 120° F. to about 210° F. for at least 8 hours.

References Cited in the file of this patent

UNITED STATES PATENTS

| | | |
| --- | --- | --- |
| 2,124,372 | Kesler | July 17, 1938 |
| 2,424,050 | Pecker et al. | July 15, 1947 |
| 2,462,108 | La Piana | Feb. 22, 1949 |
| 2,494,191 | Neumann | Jan. 10, 1950 |

FOREIGN PATENTS

| | | |
| --- | --- | --- |
| 763,861 | Great Britain | Dec. 19, 1956 |

OTHER REFERENCES

American Dyestuff Reporter, November 4, 1946, pp. 524–525.